United States Patent [19]

Nahm et al.

[11] Patent Number: 5,332,040
[45] Date of Patent: Jul. 26, 1994

[54] PROCESS TO CEMENT A CASING IN A WELLBORE

[75] Inventors: James J. W. Nahm; Arthur H. Hale, both of Houston; Kenneth M. Cowan, Sugar Land, all of Tex.

[73] Assignee: Shell Oil Company, Houston, Tex.

[21] Appl. No.: 964,976

[22] Filed: Oct. 22, 1992

[51] Int. Cl.$^5$ .............................................. E21B 33/14
[52] U.S. Cl. .................... 166/293; 166/285; 166/292; 166/295
[58] Field of Search ............... 166/285, 292, 293, 294, 166/295, 300; 175/65, 72

[56] References Cited

U.S. PATENT DOCUMENTS

| | | |
|---|---|---|
| 2,336,723 | 12/1943 | Drummond . |
| 2,609,881 | 9/1952 | Warren ..................... 166/285 |
| 2,649,160 | 8/1953 | Williams et al. . |
| 2,822,873 | 2/1958 | Harmsen et al. . |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,409,093 | 11/1968 | Cunningham et al. ............... 175/65 |
| 3,412,564 | 11/1968 | McClintock . |
| 3,499,491 | 3/1970 | Wyant et al. . |
| 3,526,280 | 9/1970 | Aulick ..................... 166/285 |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |

(List continued on next page.)

FOREIGN PATENT DOCUMENTS 85-144069/24 7/1983 Japan .
61-48454 3/1986 Japan .
833-704 6/1981 U.S.S.R. .

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.
"Mud Disposal: An Industry Perspective", Hanson et al, Drilling, May 1986, pp. 16–21.
"Waste Minimization Program Can Reduce Drilling Costs", Hall et al, Oryx Energy Co., Houston, Tex., Oil & Gas Journal, Jul. 1, 1991, pp. 43–46.
"Phosphoric Acids and Phosphates", Krik-Othmer Enc. of Chemical Technology, 3rd Ed., vol. 17, p. 477.
"Conversion of Drilling Fluids to Cements with Blast Furnace Slag-Performance Properties and Applications for Well Cementing", SPE Paper 24575 (Oct. 4, 1992) by Cowan et al.
"Quantitative Interpretation of X-Ray Diffraction Patterns of Mixtures.I.Matrix-Flushing Method for Quantitative Multicomponent Analysis" by Frank H. Chung, J. Appl. Cryst. (1974) 7, pp. 519–525.

*Primary Examiner*—George A. Suchfield

[57] ABSTRACT

A method of cementing a casing in a wellbore is provided wherein a cement slurry is placed in the wellbore prior to inserting the casing into the wellbore. Voids in the resultant cement caused by poor centralization are eliminated by placement of the cement in the wellbore prior to insertion of the casing.

15 Claims, No Drawings

U.S. PATENT DOCUMENTS

| | | | |
|---|---|---|---|
| 4,312,405 | 1/1982 | Wilder | 166/285 |
| 4,335,980 | 6/1982 | DePriester . | |
| 4,338,134 | 7/1982 | Graf zu Munster . | |
| 4,425,055 | 1/1984 | Tiedemann . | |
| 4,427,320 | 1/1984 | Bhula . | |
| 4,450,009 | 5/1984 | Childs et al. . | |
| 4,460,292 | 7/1984 | Durham et al. . | |
| 4,518,508 | 5/1985 | Conner | 210/751 |
| 4,524,828 | 6/1985 | Sabins et al. | 166/293 |
| 4,643,617 | 2/1987 | Kanno et al. | 405/222 |
| 4,664,843 | 5/1987 | Burba, III et al. . | |
| 4,668,128 | 5/2687 | Hartley et al. . | |
| 4,674,574 | 6/1987 | Savoly et al. | 166/293 |
| 4,690,589 | 9/1987 | Owa | 405/263 |
| 4,692,065 | 9/1987 | Suzuki et al. | 405/211 |
| 4,720,214 | 1/1988 | Brasted et al. . | |
| 4,746,245 | 5/1988 | Mork | 405/224 |
| 4,760,882 | 8/1988 | Novak . | |
| 4,790,954 | 12/1988 | Burba, III et al. . | |
| 4,880,468 | 11/1989 | Bowlin et al. . | |
| 4,897,119 | 1/1990 | Clarke . | |
| 4,913,585 | 4/1990 | Thompson et al. . | |
| 4,942,929 | 7/1990 | Malachosky et al. . | |
| 4,991,668 | 2/1991 | Rehm et al. . | |
| 5,016,711 | 5/1991 | Cowan . | |
| 5,020,598 | 6/1991 | Cowan et al. | 166/293 |
| 5,026,215 | 6/1991 | Clarke . | |
| 5,058,679 | 10/1991 | Hale et al. . | |
| 5,082,499 | 1/1992 | Shen | 106/735 |
| 5,086,850 | 2/1992 | Harris et al. . | |
| 5,105,885 | 4/1992 | Bray et al. . | |
| 5,106,423 | 4/1992 | Clarke . | |
| 5,121,795 | 6/1992 | Ewert et al. . | |
| 5,123,487 | 6/1992 | Harris et al. . | |
| 5,125,455 | 6/1992 | Harris et al. . | |
| 5,127,473 | 7/1992 | Harris et al. . | |
| 5,133,806 | 7/1992 | Sakamoto et al. | 106/811 |
| 5,147,565 | 9/1992 | Bour et al. | 252/8.551 | ptinstan
PROCESS TO CEMENT A CASING IN A WELLBORE

FIELD OF THE INVENTION

This invention relates to a method to cement casings into wellbores.

BACKGROUND OF THE INVENTION

For over 90 years, annuli between oil well casings and surrounding boreholes have been cemented to prevent vertical communication of formation fluids outside of the casing. This has, in the past, been accomplished by placing the casing in the well bore, and then circulating a cement slurry down the casing and up the annulus around the casing then allowing the cement to set in the annulus. Circulation of the cement slurry into place this way does not always effectively displace drilling fluids. Drilling fluids that are not displaced by cement slurries create voids in the set cement. These voids can result in channels for undesirable vertical communication of formation fluids.

Voids often result from the casing not being effectively centralized. When the casing is close to the borehole wall along one side of the casing the cement slurry will then tend to flow up the wider portion of the annulus and bypass portions of the annulus where the casing is near the wellbore wall. Drilling fluids are also difficult to displace from washed-out or otherwise enlarged portions of the wellbore. Such voids in casing cement are not only difficult to avoid, but are very difficult to correct after the cement has hardened.

Difficulties in displacing drilling fluids are compounded by incompatibility between most drilling fluids and Portland type cement slurries.

Displacement of drilling fluids in extended reach drilling is particularly difficult not only due to typically poor centralization, but a tendency for slurries having a density different from the drilling fluid to form a layer over or under the drilling fluid. Slimhole drilling results in additional difficulties in removing drilling fluids because of the more narrow annulus this technique creates.

It is therefore an object of the present invention to provide a method for cementing a casing into a wellbore wherein voids in the cement due to poorly centralized casings are eliminated. It is a further object to provide such a method wherein washouts and other enlarged portions of the borehole are filled with cement.

SUMMARY OF THE INVENTION

These and other objects are accomplished by a method to cement an annulus surrounding a casing within a wellbore, the method comprising the steps of: 1) placing a cement slurry in the wellbore in at least a portion of the wellbore within which the casing is to be cemented; 2) inserting the casing into the cement slurry; and 3) allowing the cement slurry to harden in the annulus surrounding the casing. In a preferred embodiment, the casing is inserted filled with a drilling fluid that is compatible with the cement slurry but that does not harden into a cement. Alternatively, the casing can be inserted with the end of the casing fitted with a plug. The wellbore can be initially filled with a cement slurry, or a volume of cement slurry can initially be placed in the wellbore that will fill the annulus to be cemented after the casing is inserted.

The cement slurry is preferably a blast furnace slag based cement slurry. Blast furnace slag based cement slurries will not gel quickly, as do Portland cement slurries. A casing can therefore be inserted into the blast furnace slag based slurry with considerably less force than would be necessary to force the casing into a Portland cement slurry.

The cement slurry is preferably a drilling fluid based slurry. Drilling fluid containing blast furnace slag is most preferred. Drilling fluid containing blast furnace slag can be converted to a settable cement slurry by addition of more blast furnace slag and/or activators and then circulation of the cement slurry into the wellbore.

The present invention eliminates cement voids due to poor centralization of the casing in the portion of the wellbore in which the cement slurry is initially placed by avoiding the need to displace cement slurry up an annulus.

The preferred blast furnace slag based cement slurry most preferably contains a polymer containing acid functional groups. Metal oxides present in the blast furnace slag crosslink the polymers by complexing with the acid functional groups, thereby establishing a solid crosslinked ionomer network in the set slag cement. Including this polymer in the cement composition imparts significant flexibility and ductility to the set cement and decreases permeability of the set cement.

DETAILED DESCRIPTION OF THE INVENTION

In this description the term 'cementitious component' means either an hydraulic material which on contact with water and/or activators hardens or sets into a solidified composition or a component which, on contact with a reactive second component, sets or hardens into a solidified composition. Thus, broadly it can be viewed as a material which can chemically combine to form a cement.

The initial drilling fluid or mud can be either a conventional drilling fluid, i.e., one not containing a cementitious component, or it can be one already containing a cementitious component in a relatively small amount. The drilling fluid can be either a water-based fluid or an oil-based fluid. The term 'water-based fluid' is intended to encompass both fresh water muds, salt water containing muds, whether made from seawater or brine, and other muds having water as the continuous phase including oil-in-water emulsions. It is generally preferred that the water-based drilling fluids use water containing dissolved salts, particularly sodium chloride. In these instances, 0 wt % sodium chloride to the amount required to saturate the solution may be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KBr, KCl, $CaCl_2$, $NaNO_3$, $KNO_3$, $NaC_2H_3O_2$, $KC_2H_3O_2$, $NaCHO_2$ and $KCHO_2$ among which sodium chloride is preferred, as noted above. The term 'oil-based fluids' is meant to cover fluids having oil as the continuous phase, including low water content oil-base mud and invert oil-emulsion mud.

The term 'universal fluid' is used herein to designate those compositions containing cementitious material, which compositions are suitable for use as a drilling fluid, and which compositions thereafter, for the purpose of practicing this invention, have additional cementitious material and/or activators such as accelerators (or reactive second components) added to give a cementitious slurry.

The cementitious component can be any one or more of: conventional hydraulic cement, blast furnace slag, natural or artificial pozzolan, or an acid functionalized polymer with a metal oxide crosslinker. The preferred cementitious material is one selected from the group consisting of blast furnace slag, and blast furnace slag plus the acid functionalized polymer.

By blast furnace slag is meant the hydraulic refuse from the melting of metals or reduction of ores in a furnace as disclosed in Hale and Cowan, U.S. Pat. No. 5,058,679 (Oct. 22, 1991), the disclosure of which is hereby incorporated by reference.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a surface area between 500 cm$^2$/g and 15,000 cm$^2$/g and more preferably, between 3,000 cm$^2$/g and 15,000 cm$^2$/g, even more preferably, between 4,000 cm$^2$/g and 9,000 cm$^2$/g, most preferably between 4,000 cm$^2$/g and 6,500 cm$^2$/g, all as Blaine specific surface areas. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

Blast furnace slag having relatively small particle size is frequently desirable because of the greater strength it imparts in many instances to a final cement. Characterized in terms of particle size the term "fine" can be used to describe particles in the range of 4,000 to 7,000 cm$^2$/g. Corresponding to 16 to 31 microns in size; "microfine" can be used to describe those particles in the 7,000 to 10,000 cm$^2$/g range that correspond to particles of 5.5–16 microns in size and "ultrafine" can be used to describe particles over 10,000 cm$^2$/g that correspond to particles 5.5 microns and smaller in size, all as Blaine specific surface areas.

Small particle size blast furnace slag is also preferred when the cement slurry must set at low temperatures. The "microfine" blast furnace slag is therefore preferred when the cement slurry must be settable at temperatures less than about 100° F. Thus, "microfine" blast furnace slag is preferred when the bottom hole temperature of the wellbore is less than about 100° F.

However, it is very time consuming to grind blast furnace slag to these particles sizes. It is not possible to grind blast furnace slag in a manner where particles are entirely once size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 20 wt %, more preferably 5 to 8 wt % can be ground to the ultrafine particle size and the remainder ground in a normal way thus giving particles generally in a size range of greater than 11 microns, the majority being in the 11 to 31 micron range.

Setting of blast furnace slags may be retarded sufficiently by available cement retarders. Lignosulfonates, in particular, can be effective for delaying setting of blast furnace slag cement slurries for days. Other known retarders useful in Portland cements, such as acetic acid, are also useful in retarding setting of blast furnace slag cements.

By ionomer is meant organometal compositions having a metal attached to or interlocking (crosslinking) a polymer chain. Ionomers may be formed by combining acid functionalized polymers with metal ion crosslinkers. Suitable acid functionalized polymer components of such ionomers can be represented by the formula

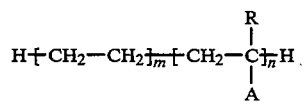

wherein A is

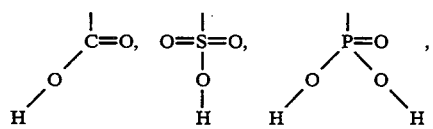

or a mixture of

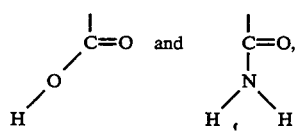

and wherein R is H or a 1-10 carbon atom alkyl radical. The ratio of m to n is generally within the range of 0:1 to 100:1, preferably 0.1:1 to 10:1.

To form sufficient crosslinking, the polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One of the more preferred polymers is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000-15,000,000 molecular weight are suitable. The copolymers will generally have from 2-99, preferably 5-80, more preferably 10-60 mole percent acid-containing units.

The acid functionalized polymers suitable for use in this invention form an ionomer reaction product with a metal component. The metal component serves as the cementitious component. The metal component generally is a metal oxide which is a proton acceptor such as CaO, MgO, ZnO or MnO. The preferred metal oxides are magnesium oxide and zinc oxide. Most preferably, the metal oxide is magnesium oxide. The applicable metal oxides are generally fired at temperatures above 1,000° F. for several hours to reduce chemical activity prior to grinding to final particle size for use in reacting with the polymer. Blast furnace slag contains such suitable metal oxides to function as the metal components.

The polycarboxylates can be any of the known water soluble carboxylic acid polymers known in the art for forming ionomers when combined with metal oxides. Suitable acids include poly(acrylic acid) poly(methacrylic acid), polysulfonated styrene maleic anhydride, poly(ethacrylic acid), polysulfonate syreneitanoic acid, poly(fumaric acid), poly(maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid,

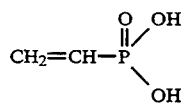

Suitable copolymers containing vinyl phosphonic acid include vinyl phosphonic acid/acrylic acid copolymer as well as copolymers with other unsaturated monomers, with or without a functional group.

Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

Setting of the acid functionalized polymer cement slurries of the present invention may be retarded by substitution of ester groups for some or all of the acid functionality. The ester functionality will hydrolyze to acid groups upon exposure to water, and the resulting acid functional groups will then form complexes with the metal component.

The particle size of the metal components can vary widely. Generally, it will be within the range such that the powder exhibits a surface area within the range of 500 $cm^2/g$ to 30,000 $cm^2/g$, preferably 1,500 $cm^2/g$ to 25,000 $cm^2/g$, most preferably 2,000 $cm^2/g$ to 20,000 $cm^2/g$, all as Blaine specific surface areas.

Because of the mass provided by the metal component of the ionomer, these cementitious materials are generally actually heavier than most slag or Portland cement materials. In the embodiments using these cementitious materials this high density provides significant advantages in certain utilities. For one thing, a smaller amount of the material can be used and still achieve a final mud and ultimately cement of a desired density. Secondly, because of the high density, it is possible to operate without weighting agents such as barium sulfate or barite. They offer a further advantage in that they do not set up until the second component is added.

The metal component of the ionomer can be used as the sole cementitious material or can be used in admixture with siliceous hydraulic materials such as the blast furnace slag or Portland cement. In one embodiment an hydraulic component such as slag can be used to give the metal ion component of the ionomer to give, in effect, a mixture formed in situ.

Preferably, when the ionomer is utilized, the metal component is added first and thereafter at such time as it is desired for the cement to be activated to set, the other component is added. In the case of the universal fluids, a portion of the total metal component can be added to the drilling fluid, the remainder being added after dilution when the cementitious slurry is being formed. Because of the high density of the metal component in these cementitious materials, a smaller amount by volume of the metal component can be used as compared with the amount used if a siliceous material is being used.

In accordance with the invention that utilizes universal fluid, the fluid itself becomes a part of the final cement and thus, this portion of the drilling fluid does not need to be disposed.

The ionomer embodiments of this invention are of particular value for cementing the annulus between a wellbore wall and a casing, or between casings where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. For similar reasons the ionomer embodiment of the invention is beneficial in cementing liners and tieback casing strings which may otherwise leak due to changes in pressure and temperature in the well during production operations. Another area where the ductility of the ionomer cement is of special value is in slimhole wells where the annulus is smaller. Still yet another area where this ductility is important is in extended reach drilling. The term 'extended reach' is intended to cover horizontal drilling and any other well drilling operations which are off-vertical a sufficient amount to cause the casing to be displaced by gravity toward one side of the borehole.

As noted hereinabove the initial drilling fluid can be either a conventional drilling fluid or it can be a universal fluid which already has cementitious material therein.

Mixed metal hydroxides are preferably used in the drilling fluid of the present invention to impart thixotropic properties. The mixed metal hydroxides provide excellent solids suspension. This, in combination with the settable filter cake provided in the technique of using universal fluids, greatly enhances the cementing in a restricted annulus. The mixed metal hydroxides are particularly effective in muds containing clay such as sodium bentonite. Preferred systems thickened in this way contain from 1-20 lbs/bbl of clay such as bentonite, preferably 7 to 12 lbs/bbl. The mixed metal hydroxides are generally present in an amount within the range of 0.1 to 2 lbs/bbl of total drilling fluid, preferably 0.7 to 1.2 lbs/bbl. Mixed metal hydroxides are known in the art and are trivalent metal hydroxide-containing compositions such as $MgAl(OH)_{4.7}Cl_{0.3}$. They conform essentially to the formula $$Li_m D_d T(OH)_{(m+2d+3+na)} A'_a^n$$

where m represents the number of Li ions present; the said amount being in the range of zero to about 1;

D represents divalent metals ions; with d representing the amount of D ions in the range of zero to about 4;

T represents trivalent metal ions;

A' represents monovalent or polyvalent anions of valence $-n$, other than $OH^-$, with a being the amount of A' anions; and where $(m+2d+3+na)$ is equal to or greater than 3.

A more detailed description can be found in Burba, U.S. Pat. No. 4,664,843 (May 12, 1987). The mixed metal hydroxides in the drilling fluid, in combination with blast furnace slag, tend to set to a cement having considerable strength in a comparatively short time, i.e., about one-half hour at temperatures as low as 100° F. This can be a major asset in some applications. In such instances, a thinner such as a lignosulfate is preferably added before adding slag. However, one of the advantages of this invention is that it reduces or eliminates the need for additives to control free water or solids suspension. The activator or activators can be added either with any other ingredients that are added before the additional blast furnace slag, with the additional blast furnace slag, or after the addition of the additional blast furnace slag.

In some instances, it may be desirable to use a material that functions as a retarder along with the activator because of the need for other effects brought about by the retarder. For instance, a chromium lignosulfonate may be used as a thinner along with the activator even though it also functions as a retarder.

Other suitable thinners include chrome-free lignosulfonate, lignite, sulfonated lignite, sulfonated styrene maleic-anhydride, sulfomethylated humic acid, naphthalene sulfonate, a blend of polyacrylate and polymethacrylate, an acrylamideacrylic acid copolymer, a phenol sulfonate, a naphthalene sulfonate, dodecylbenzene sulfonate, and mixtures thereof.

In the case of hydraulic materials, particularly the more preferred hydraulic material, blast furnace slag, the amount of hydraulic material present in the universal fluid is generally within the range of 1 to 100 lbs/bbl of final drilling fluid, preferably 10 to 80 lbs/bbl, most preferably 20 to 50 lbs/bbl. In the case of the organometals (ionomers) the amount of metal component initially present in universal fluid can also vary widely. Generally, 1 to 500 lbs/bbl, preferably 50 to 300 lbs/bbl, most preferably 100 to 250 lbs/bbl of the metal component are used.

The total amount of cementitious material in the cementitious slurry will typically range from about 20 lbs/bbl to about 600 lbs/bbl, preferably between 50 lbs/bbl and 500 lbs/bbl, and most preferably between 100 lbs/bbl and 350 lbs/bbl.

Reference herein to additives encompasses both the specialized additives necessary for this invention such as the carboxylic acid polymer in the case of the ionomer conventional additives.

Conventional additives which can be added include accelerators, retarders, and other known components of cementitious materials.

Suitable fluid loss additives found in drilling fluids include bentonite clay, carboxymethylated starches, starches, carboxymethyl cellulose, synthetic resins such as "POLYDRILU" by SKW Chemicals, sulfonated lignite, lignites, lignin, or tannin compounds. Weight materials include barite, calcium carbonate, hematite and MgO, for example. Shale stabilizers that are used in drilling fluids include hydrolyzed polyacrylonitrile, partially hydrolyzed polyacrylamide, salts including NaCl, KCl, sodium or potassium formate, sodium or potassium acetate, polyethers and polycyclic and/or polyalcohols. Viscosifying additives can be used such as biopolymers, starches, attapulgite and sepiolite. Additives are also used to reduce torque. Suitable thinners such as chrome and chrome free lignosulfonates, sulfonated styrene maleic-anhydride and polyacrylate may also be used depending upon the mud type and mud weight. Lubricating additives include nonionic detergents and oil (diesel, mineral oil, vegetable oil, synthetic oil), for instance. Alkalinity control can be obtained with KOH, NaOH or CaO, for instance. In addition, other additives such as corrosion inhibitors, nut hulls etc. may be found in a typical drilling fluid. Of course, drill solids including such minerals as quartz and clay minerals (smectite, illite, chlorite, kaolinite, etc.) may be found in a typical mud.

It is particularly desirable in accordance with a further embodiment of this invention to utilize silica to increase the temperature resistance of the final cement. The use of blast furnace slag as the hydraulic component, in itself, allows greater latitude in the temperature which can be tolerated, because the blast furnace slag is inherently less thermally sensitive than other known hydraulic components such as Portland cement and thus can be hardened over a wider range of temperatures without resort to additives. This is of particular advantage where there is a substantial temperature gradient from the top to the bottom of a borehole section to be cemented. However, with the addition of silica, further temperature resistance can be imparted to the cement after it is set. Thus, with blast furnace slag and silica a temperature resistant cement is possible and with other cementitious components the temperature range can be extended through the used silica. Suitable silicas include crystalline silicas such as alpha quartz.

In another embodiment of this invention, most or all of the components of the drilling fluid are chosen such that they have a function in the cementitious material also. The following Table illustrates the uniqueness of such formulations.

TABLE 1

| Additive | Function | | | |
|---|---|---|---|---|
| | Drilling Fluid | | Cementitious Solid | |
| | Primary | Secondary | Primary | Secondary |
| Synthetic polymer[1] | Fluid loss control | | Fluid loss control | Retarder |
| Starch[2] | Fluid loss control | Viscosity | Fluid loss control | Retarder |
| Biopolymer[3] | Viscosity | | Viscosity | Retarder |
| Silicate | Viscosity | Shale stabilizer | Accelerator | — |
| Carbohydrate polymer[4] | Deflocculant | — | Retarder | Deflocculant |
| Barite[5] | Density | — | Density concentration | Solids |
| Bentonite[6] | Fluid loss control | — | Fluid loss control | Solids concentr. |
| Clay/Quartz dust | — | — | Solids concentration | — |
| Metal Component[8] | Cutting stabilizer | — | Cement component | Solids |
| Functional Group Polymer | Not Present | Not Present | Cement component | — |
| Lime | Cutting/Wellbore stabilizer | Alkalinity | Accelerator concentration | Solids |
| PECP[9] | Shale stabilizer | Fluid loss | Retarder | Rheological control |
| NaCl | Shale stabilizer | — | — | — |

[1]Polydrill, A synthetic polymer manufactured by SKW Chemicals Inc. under trade name Polydrill, for instance
[2]Starch made by Milpark Inc. under the trade name "PERMALOSE", for instance.
[3]A biopolymer made by Kelco Oil Field Group, Inc., under the trade name "BIOZAN" for instance.
[4]Water-soluble carbohydrate polymer manufactured by Grain Processing Co. under trade name "MOR-REX".
[5]Barite is BaSo4, a drilling fluid weighting agent.
[6]Bentonite is clay or colloidal clay thickening agent.
[7]Clay/quartz solid dust manufactured by MilWhite Corp. under the trade name "REVDUST", for instance.
[8]Blast furnace slag manufactured by Blue Circle Cement Co. under the trade name "NEWCEM" is suitable.
[9]Polycylicpolyetherpolyol The material in the above Table A labeled PECP is of special significance in connection with this invention. This refers to a polyhydric alcohol most preferably a polycyclicpolyetherpolyol. A general chemical composition formula representative of one class of these materials is as follows:

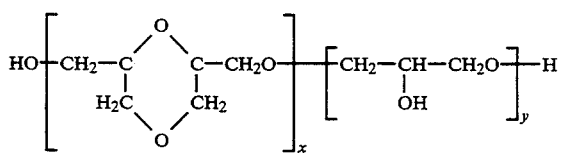

where $x \geq 1$ and $y \geq 0$.

A more complete description of these polycyclicpolyetherpolyols is found in the Hale and Cowan patent, U.S. Pat. No. 5,058,679 (Oct. 22, 1991), referred to hereinabove, the disclosure of which is incorporated herein by reference.

Universal drilling fluids which utilize blast furnace slag can be subsequently activated with sodium silicate, lime, sodium carbonate, sodium hydroxide or a combination, to cause the drilling fluid to develop compressive strength with time. A combination of sodium hydroxide and sodium carbonate is preferred. In addition, blast furnace slag can be added between the use of this material as a drilling fluid and its use as a cement. The additional slag can be the activator, especially if heat is imparted to the operation. Each component is an important ingredient for both the drilling fluid and the cement. The PECP is particularly significant in combination with slag since it acts as a retarder and thus provides significant drilling fluid functions in general and specific drilling functions relative to the slag component as well as significant cement functions. PECP also reduces the friction coefficient of muds on casing and filter cake, and pullout forces required to release stuck pipe are dramatically reduced with PECP in the drilling fluid. In addition, PECP aids in control of theology as a result of its tendency to adsorb onto polymer and clay solid surfaces.

The unique advantage of universal fluids is that wellbore stabilization, fluid-loss control, and cuttings transport can be realized essentially the same as with conventional drilling fluid systems. However, with the simple presence of activators in the subsequent cementitious slurry, the resulting mud-slag system will develop strength. Thus, for instance, (1) drilling fluid filter cake deposited while drilling over permeable zones can be converted into an effective sealant by diffusion of activators from the mud-slag column; and (2), hole mud that has not been removed from washed-out sections of the hole during displacement will harden with time and, therefore, provide an effective sealant and lateral support to the casing.

In areas such as slimhole drilling, the ionomer universal fluid gives the process benefit of avoiding the removal of an incompatible drilling mud and the product benefit of being resistant to deflection when set.

Process and apparatus used to drill and cement are well known. One example can briefly illustrate typical practice as follows. A well is drilled using a hollow drill string having a drill bit with at least one orifice providing communication between the inside of the hollow drill string and the outside of the drill string. During this drilling, a drilling fluid is circulated down the inside of the drill string and out of the orifice at the lower end thereof. The drilling fluid serves to cool and lubricate the drill bit and to transport drilling cuttings up the borehole in the annulus surrounding the drillstring. When the drilling is complete, the drill string can be withdrawn from the wellbore and another tubular inserted for placing cement slurry in the portion of the wellbore to be cemented. Alternatively, cement slurry can be placed in the wellbore through the drill string and drill bit. After the cement slurry is placed in the wellbore, the casing is inserted into the cement slurry within the wellbore. The casing can be inserted with a non-settable fluid (such as a drilling or universal fluid) within the casing. This non-settable fluid may be separated from the cement slurry by a plug at the end of the casing. The plug may be a drillable plug if the wellbore is to be drilled to greater depths.

After the casing is inserted into the wellbore, it is preferred that the casing be "reciprocated" or otherwise moved or vibrated. This movement will help mix any loose mud or filter cake with the cement slurry to result in a more uniform set cement. The reciprocation may be accomplished by pulling the casing up and down within the wellbore from the rig. This reciprocation may be done with or without rotation.

In another related embodiment of this invention, universal fluid is utilized in a drilling operation and thereafter additional cementitious material and/or additives, or the second component of a two-component system, is gradually added so as to gradually transition the circulating material from a drilling fluid to a cementitious slurry and then the drill string is removed and a casing inserted into the wellbore. In this embodiment the filter cake is "set" by activator of the cementitious slurry. The activator can be any of the alkaline activators referred to hereinabove such as a mixture of sodium hydroxide and sodium carbonate when the universal fluid contains a metal component.

Another advantage of this invention is the elimination of the situation known as accidental over-displacement. In conventional drilling and cementing, the transition from drilling to cementing is a multi-stage, complex operation under the best of circumstances. Generally, a bottom wiper plug with a diaphragm is introduced into the casing being installed, followed by a spacer fluid which may be brine, followed by the cementitious slurry. On top of the cementitious slurry fluid is a top solid-core plug which is forced down the casing by means of a displacement fluid such as brine or drilling mud. Since the seal at the bottom of the casing is important, the operation is usually stopped short of completely displacing the cement in the bottom of the casing. This, however, necessitates drilling through the cement in order to effect further drilling. When the cementitious slurry is inadvertently overdisplaced, some of the displacement fluid enters the annulus at the bottom of the casing. This results in a poor cementing job because the displacement fluid would not typically have any cementitious properties. The displacement fluid would tend to weaken any cement resulting from slurry contaminated with displacement fluid.

In the practice of the present invention, the casing can be inserted with a plug at the lower end of the casing. If further drilling is placed, this plug can be a drillable plug. Cement slurry is not displaced down the casing, so over-displacement is not a possibility, and it will not be necessary to drill through an excessive amount of set cement in the casing.

The casing cemented in place in the practice of the present invention can be atypical steel casing within a wellbore, or may be a casing of another material such as fiberglass. The casing may be a production casing, a surface casing, or any intermediate casing. The casing may also be a piling. The casing could be cemented into a formation, or into another casing surrounding the casing being cemented into place.

EXAMPLES

Cement slurries were prepared that would be acceptable for setting a casing in wellbores of varying temperatures according to the present invention. Although cement slurries A through D harden at temperatures of 40° F. to 60° F., slurries E through G have extended setting times at 165° F. Setting times and final compressive strength are below in Table 1 along with slurry composition and properties.

TABLE 1

| SLURRY | A | B | C | D | E | F | G |
|---|---|---|---|---|---|---|---|
| Slurry Density (lb/gal) | 12.0 | 12.1 | 12.0 | 12.0 | 15.2 | 15.1 | 15.1 |
| Initial liquid vol. (bbl/bbl slurry) | 0.778 | 0.778 | 0.775 | 0.773 | 0.73 | 0.723 | 0.723 |
| "SUPERCENE CF" | 0 | 0 | 0 | 0 | 4 | 0 | 0 |
| "SUPERCENE" | 0 | 0 | 0 | 0 | 0 | 2 | 3 |
| "Q-BROXIN" (lb/bbl) | 3 | 3 | 3 | 0 | 2 | .3 | |
| NaOH (lb/bbl) | 8 | 0 | 0 | 8 | 4 | 2 | 3 |
| Na$_2$CO$_3$ (lb/bbl) | 12 | 0 | 0 | 12 | 14 | 10 | 10 |
| LiOH (lb/bb)) | 0 | 8 | 8 | 0 | 0 | 0 | 0 |
| Li$_2$CO$_3$ (lb/bbl) | 0 | 12 | 12 | 0 | 0 | 0 | 0 |
| Blast furnace slag (lb/bbl) | 200 | 200 | 200 | 200 | 250 | 250 | 250 |

TABLE 1-continued

| SLURRY | A | B | C | D | E | F | G |
|---|---|---|---|---|---|---|---|
| Plastic viscosity - cp | 24 | 7 | 31 | 24 | 97 | 90 | 120 |
| Yield Point (lb/100 ft$^2$) | 60 | 2 | 12 | 33 | 30 | 23 | 31 |
| 10-sec. Gel Strength (lb/100 ft$^2$) | 34 | 3 | 6 | 14 | 5 | 5 | 6 |
| 10-min. Gel Strength (lb/100 ft$^2$) | 61 | 8 | 50 | 30 | 30 | 18 | 31 |
| Set Time (hr:min) | 74:00 | 8:22 | 24:24 | 35:04 | 6:50 | 14:32 | 22:57 |
| Set Temperature (°F.) | 40 | 70 | 70 | 70 | 165 | 165 | 165 |
| Compressive Strength (psi) | 2223 | 1020 | 2107 | 2557 | 3620 | 3880 | 3698 |
| Compressive Strength time (days) | 12 | 8 | 8 | 8 | 106 | 106 | 106 |

Slurry B was prepared with sea water only.
Slurry C was prepared with sea water containing Bentonite.
Slurry D was prepared from sea water containing Bentonite and about 1/47 2 lb/bbl of "Q-BROXIN.
Slurry A was prepared from a 8.7 lb/gal sea water mud.
Slurries E, F, and G were prepared from a 12 lb/gal PAPH drilling fluid containing 10% by weight salt from the drilling of a Gulf of Mexico well.
The blast furnace slag used in slurries B, C, and D was "NEWCEM". The blast furnace slag used in slurry A was from KOCH Minerals of Wichita, Kansas and had a specific surface area of 10,040 cm/gm. The blast furnace slag used in slurries E, F, and G was "NEWCEM" from the Blue Circle Cement Co.
"SUPERCENE" is a chrome lignosulfonate and "SUPERCENE CF" is a chrome-free lignosulfonate, both available from Baroid.
"Q-BROXIN" is another lignofsulfonate, available from Baroid These examples demonstrate that cement slurries can be prepared with setting times sufficiently long to permit placement of the slurry prior to inserting a casing into a wellbore.

While this invention has been describe in detail for the purpose of illustration, it is not to be construed as limited thereby, but is intended to cover all the changes and modification within the spirit and scope thereof and within the scope of the following claims.

We claim:

1. A method for cementing a wellbore, the method comprising the steps of:
   a) first placing a cementitious slurry comprising granulated water-quenched blast furnace slag in a wellbore;
   b) inserting a casing into the wellbore after said cementitious slurry is placed in said wellbore, said casing being substantially centralized in said wellbore;
   c) allowing the cementitious slurry to harden in the annulus surrounding the casing.

2. The method of claim 1 wherein a non-settable fluid is inserted with the casing, inside of the casing, into the cement slurry.

3. The method of claim 2 wherein the non-settable fluid is separated from the cement slurry by a plug at the end of the casing.

4. The method of claim 3 wherein the plug is a drillable plug.

5. The method of claim 1 wherein the blast furnace slag is of a weight average particle size of between about 500 and about 15,000 cm$^2$/g.

6. The method of claim 5 wherein the blast furnace slag is microfine blast furnace slag and the wellbore has a bottom hole temperature of about 100° F. or less.

7. The method of claim 1 wherein the cement slurry further comprises a polymer, the polymer comprising acid functionality, and a metal component that is a crosslinker.

8. The method of claim 1 wherein the cementitious slurry further comprises a lignosulfonate setting retarder.

9. The method of claim 1 wherein the cementitious slurry is a universal fluid based cementitious slurry.

10. The method of claim 9 wherein the universal fluid based cement slurry is blended from a granulated water-quenched blast furnace slag containing drilling fluid.

11. The method of claim 10 wherein the cementitious slurry further comprises polycyclicpolyether.

12. The method of claim 1 wherein the wellbore is selected from the group consisting of a slimhole wellbore and an extended reach wellbore.

13. The method of claim 1 wherein the cement slurry further comprises silica.

14. The method of claim 1 further comprising the step between inserting the casing and allowing the cement to harden, of reciprocating the casing.

15. A method for cementing a wellbore, the method comprising the steps of:
   a) first placing a cementitious slurry comprising a polymer having acid functionality and a metal component selected from the group consisting of MgO and ZnO in a wellbore;
   b) inserting a casing into the wellbore after said cementitious slurry is placed in said wellbore, said casing being substantially centralized in said wellbore;
   c) allowing the cementitious slurry to harden in the annulus surrounding the casing.

* * * * *